(12) United States Patent
Gilbert et al.

(10) Patent No.: US 9,234,350 B1
(45) Date of Patent: Jan. 12, 2016

(54) SYSTEM AND METHOD OF CONSTRUCTING A COMPOSITE ASSEMBLY

(71) Applicant: Jack Walters & Sons, Corp., Allenton, WI (US)

(72) Inventors: Fredrick R. Gilbert, Fairfield, IL (US); Daniel Pederson, Fond du Lac, WI (US); Andrew Pritzl, Madison, WI (US)

(73) Assignee: Jack Walters & Sons, Corp., Allenton, WI (US)

( * ) Notice: Subject to any disclaimer, the term of this patent is extended or adjusted under 35 U.S.C. 154(b) by 0 days.

(21) Appl. No.: 14/562,054

(22) Filed: Dec. 5, 2014

Related U.S. Application Data (60) Provisional application No. 61/912,681, filed on Dec. 6, 2013.

(51) Int. Cl.
| | | |
|---|---|---|
| *E04C 3/00* | (2006.01) | |
| *E04C 3/36* | (2006.01) | |
| *E04B 1/38* | (2006.01) | |
| *F16B 15/00* | (2006.01) | |

(52) U.S. Cl.
CPC ... *E04C 3/36* (2013.01); *E04B 1/38* (2013.01); *F16B 15/0046* (2013.01); *F16B 2015/0076* (2013.01)

(58) Field of Classification Search
CPC .. E04C 3/36; F16B 15/046; F16B 2015/0076; E04B 1/38
USPC .......................................................... 52/848
See application file for complete search history.

(56) References Cited

U.S. PATENT DOCUMENTS

| | | | |
|---|---|---|---|
| 797,083 | A | 8/1905 | Stowe |
| 1,402,304 | A | 1/1922 | Lord |
| 2,877,520 | A | 3/1959 | Jureit |
| 3,090,088 | A | 5/1963 | Foley et al. |
| 3,172,171 | A | 3/1965 | Knight |
| 3,390,902 | A | 7/1968 | Jureit |
| 3,427,055 | A | 2/1969 | Jureit et al. |
| 3,454,292 | A * | 7/1969 | Sanford ........................ 403/283 |
| 3,498,170 | A | 3/1970 | Sanford |
| 3,703,304 | A | 11/1972 | Losse |
| 3,841,195 | A | 10/1974 | Jureit |
| 4,157,676 | A | 6/1979 | Jureit |
| 4,299,511 | A | 11/1981 | Demers |
| 4,318,652 | A | 3/1982 | Gore |
| 4,336,678 | A | 6/1982 | Peters |
| 4,479,342 | A | 10/1984 | Eberle |
| 4,486,155 | A | 12/1984 | Roca-Nierga |
| 4,488,389 | A | 12/1984 | Farmont |
| 4,501,102 | A | 2/1985 | Knowles |
| 4,571,114 | A | 2/1986 | Rionda et al. |
| 4,586,550 | A | 5/1986 | Kitipornchai |

(Continued)

OTHER PUBLICATIONS

Perma-Column Brochure, Perma-Column, Inc., 2007.

*Primary Examiner* — Mark Wendell
(74) *Attorney, Agent, or Firm* — Andrus Intellectual Property Law, LLP (57) ABSTRACT

A composite assembly includes a series of elongated layers joined lengthwise thereof. At least two of the elongated layers each have an upper elongated portion and a lower elongated portion secured together in an end-to-end relationship at a joint therebetween by a connector arrangement. The upper elongated portion is constructed of a wood material, and the lower elongated portion is constructed of a non-wood material.

17 Claims, 7 Drawing Sheets

(56) References Cited

U.S. PATENT DOCUMENTS

| | | |
|---|---|---|
| 4,639,176 A | 1/1987 | Smith |
| 4,679,367 A | 7/1987 | Geisthardt |
| 4,710,083 A | 12/1987 | Wolf |
| 4,734,003 A | 3/1988 | Smith |
| 4,737,060 A | 4/1988 | Birckhead |
| 4,833,859 A | 5/1989 | Wolf |
| 4,887,952 A | 12/1989 | Wolf |
| 5,006,006 A | 4/1991 | Lehtonen |
| 5,048,256 A | 9/1991 | Thorsnes |
| 5,234,279 A | 8/1993 | Poutanen |
| 5,354,411 A | 10/1994 | Lines |
| 5,618,371 A | 4/1997 | Sing |
| 5,735,087 A | 4/1998 | Olden |
| 5,833,421 A | 11/1998 | Lees et al. |
| 5,848,866 A | 12/1998 | Black, Jr. |
| 5,852,909 A | 12/1998 | Solitis et al. |
| 5,896,716 A | 4/1999 | Jalla |
| 5,966,892 A | 10/1999 | Platt |
| 6,203,232 B1 | 3/2001 | Ward |
| 6,299,378 B1 | 10/2001 | Griffith |
| 6,409,156 B2 * | 6/2002 | Dent .............................. 256/13.1 |
| 6,964,139 B2 | 11/2005 | Meyer et al. |
| 2011/0250443 A1 * | 10/2011 | Schall ............................ 428/339 |
| 2013/0239512 A1 * | 9/2013 | Yang ............................ 52/741.3 |
| 2013/0326968 A1 | 12/2013 | Meyer et al. |

* cited by examiner

SYSTEM AND METHOD OF CONSTRUCTING A COMPOSITE ASSEMBLY

CROSS-REFERENCE TO RELATED APPLICATION

The present utility application relates to and claims priority to U.S. Provisional Patent Application Ser. No. 61/912,681 filed Dec. 6, 2013, which is herein incorporated in entirety.

FIELD OF THE DISCLOSURE

The present disclosure relates to a composite assembly for use in the construction industry. More specifically, the present disclosure relates to a composite assembly particularly constructed in a layered arrangement with wood and non-wood elongated members joined in an end-to-end relationship.

BACKGROUND

In the construction of buildings, outdoor structures or the like, it is often desirable to utilize a beam or column which includes a plurality of boards, rather than an integral post made from a single piece of building material such as wood. Many embodiments of composite assemblies use one or more connectors to connect the plurality of component boards into the composite assembly. The composite assembly made from a plurality of boards can serve as a less expensive substitute for integral posts made from a single piece of wood, which can be quite expensive. It is not uncommon for building materials to increase exponentially in cost for every increase in length or width of the building material piece.

It is known to provide a composite assembly comprised of a series of elongated layers secured together lengthwise thereof with each layer including an upper elongated support member joined to a lower elongated ground-engaging member at a joint by a connector device. In such a composite assembly, the upper elongated member is normally constructed of a non-treated wood, and the lower elongated member is typically fabricated of a treated wood. Such treated wood is infused with a chemical, such as chromated copper arsenate (CCA), to prevent the natural process of decay of the ground-engaging wood. While such a composite assembly is acceptable in commercial building application, the Environmental Protection Agency (EPA) has banned the use of wood as used in the ground-engaging lower portion of the composite assembly for most residential use.

BRIEF DISCLOSURE

Therefore, Applicant has developed a composite assembly which is compliant with EPA regulations for use in residential application, and which is disclosed herein. The composite assembly is adapted for use as a support column in a building structure, and is comprised of a series of layers joined together lengthwise thereof. At least two of the elongated layers each include an upper elongated portion and a lower elongated portion secured together in an end-to-end relationship at a joint therebetween by a connector arrangement. The upper elongated portion is constructed of a first material comprised of wood, and the lower elongated portion is constructed of a second material comprised of a material other than wood, such as plastic.

In one exemplary embodiment, the lower elongated portions are embodied in separate, integrally formed segments. In another exemplary embodiment, the lower elongated portions are jointly formed together in a unit.

In yet another exemplary embodiment, the composite assembly is adapted for use as a support column in a building structure, and is comprised of a series of layers joined together lengthwise thereof. At least two of the elongated layers each include an upper elongated portion and a unitary lower assembly secured together in an end-to-end relationship at a joint therebetween by a connector arrangement. The upper elongated portion is constructed of a first material comprised of wood, and the unitary lower assembly is constructed of a second material comprised of a material other than wood, such as plastic. Each joint between the elongated upper portion and the unitary lower assembly is staggered at different heights relative to one another.

DETAILED DESCRIPTION

Dual sided connectors and composite assemblies including dual sided connectors are disclosed herein. The dual sided connectors can be used to interconnect a member of building material such as wood or wood composite timbers or boards in order to produce beams, columns, headers, trusses, or any other composite assemblies for use in the construction of buildings or the like. Embodiments of the dual sided connector can include a base plate with a plurality of teeth extending outwardly from the base plate. The dual sided connector can be disposed between layers or plies of building material so that it bridges an inner portion of the building material. When this assembly is compressed together, the teeth engage the building material and are embedded in the building material. Thus, building material members are spliced together to form the composite assembly.

Composite assemblies formed using connector plates are economical replacements for the use of integral or one piece wooden beams or columns in building construction. The ability of a composite assembly to be formed of smaller, and therefore cheaper, building material stock allows for the creation of a composite assembly of similar dimensions and strength of an integral beam, at a fraction of the cost. Various patterns and orientations for the teeth of the connectors are known and typically include teeth that enter a wooden component member parallel to the wood grain or perpendicular to the wood grain. However, it has been determined that these tooth alignments are undesirable, and an improved tooth arrangement is needed. Connector teeth that enter the wood parallel to the wood grain promote splitting of the wood along the wood grain, while teeth that enter the wood perpendicular to the wood grain are often flattened upon insertion into the wood and therefore show reduced ability to be secured into the wood.

Figure 1:
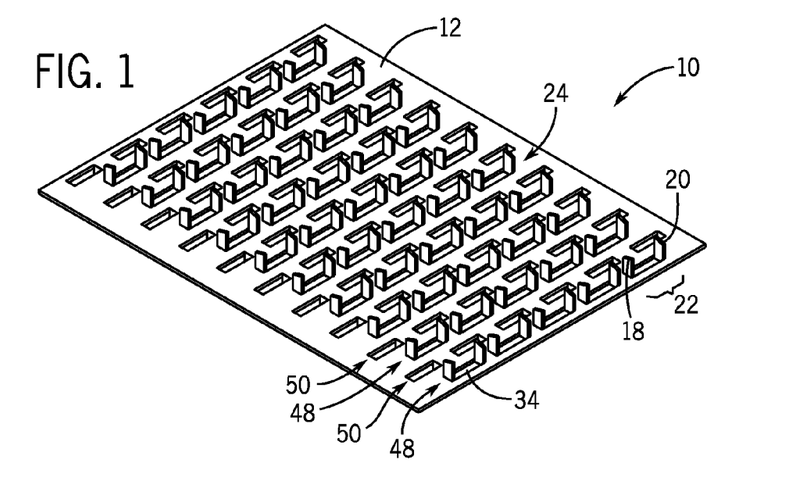
FIG. 1 is a perspective view of an embodiment of a dual sided connector used in a composite assembly.

FIG. 1 depicts an embodiment of a dual sided connector 10. The dual sided connector 10 comprises a base plate 12. The base plate 12 may be of a galvanized steel; however, the type of material for the base plate 12 should not herein be limited to galvanized steel, but may also include any other suitable material that would be recognized by one skilled in the art. A plurality of teeth including a first tooth 18 and a second tooth 20 extend outwardly from the base plate 12. The first tooth 18 and the second tooth 20 form a tooth pair 22.

Figure 3:
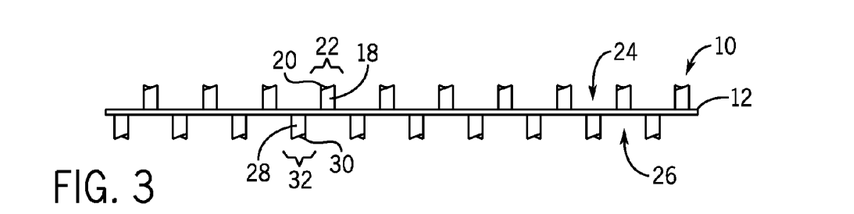
FIG. 3 is a side view of an embodiment of the dual sided connector.

Referring to FIG. 3, the base plate 12 further includes a first surface 24 and a second surface 26. The first tooth 18 and second tooth 20 form a tooth pair 22 that extends outwardly from the first surface 24 of the base plate 12. A third tooth 28 and a fourth tooth 30 form a tooth pair 32 that extends outwardly from the second surface 26 of the base plate 12. Thus, tooth pair 22 extends in an opposite direction from the base plate 12 than tooth pair 32 extends from the base plate 12.

Figure 2:
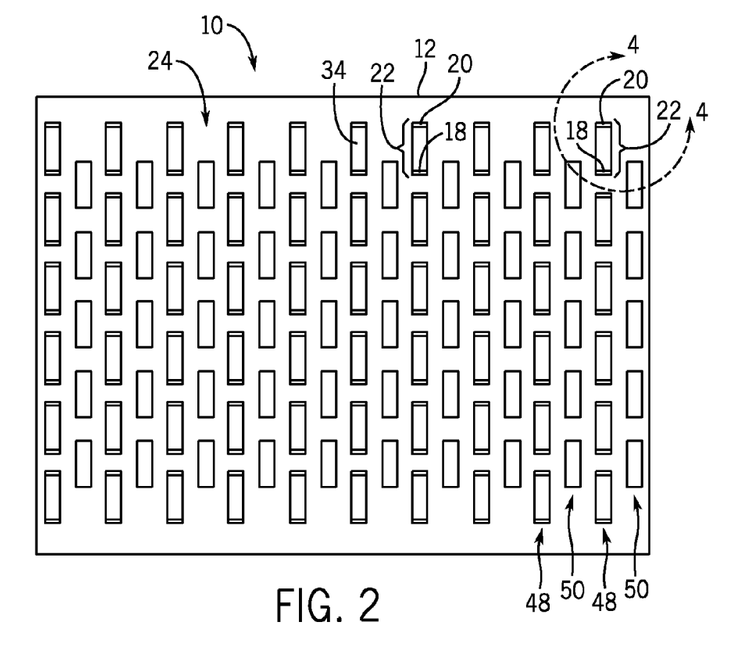
FIG. 2 is a top view of an embodiment of the dual sided connector.

In an embodiment, the outwardly extending teeth may be formed by die cutting the teeth from the material of base plate 12 through the use of a punching mechanism using a die to cut the teeth from the base plate 12. In these embodiments, the die may be formed to produce twisted teeth, as will be disclosed in greater detail herein as the die passes through the base plate 12. The punching mechanism may be arranged such that a separate die or set of dies is used to punch the teeth extending in each direction from the base plate 12. These teeth may be punched simultaneously or separately. As a result of the die cutting, some embodiments may include an opening 34 formed in the base plate 12 (as depicted in FIGS. 1 and 2) where the material for each of the teeth was removed. Each tooth pair 22 is cut by a single die cut resulting in a single opening 34 between the first tooth 18 and the second tooth 20 of the tooth pair 22.

It is understood that while for the sake of simplicity, first surface 24, first tooth 18, second tooth 20, and tooth pair 22 are described in further detail herein, the description is similarly applicable to the second surface 26, third tooth 28, fourth tooth 30, and tooth pair 32, projecting from the opposite side of base plate 12.

Figure 5:
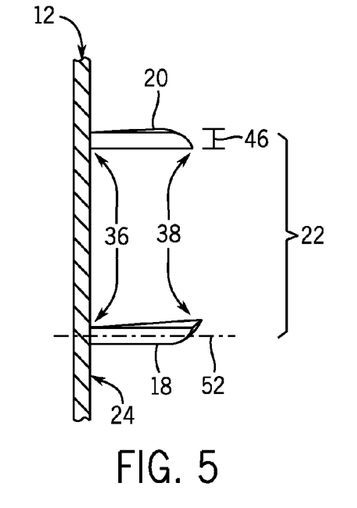
FIG. 5 is a side view of a tooth pair of the dual sided connector.
Figure 6:
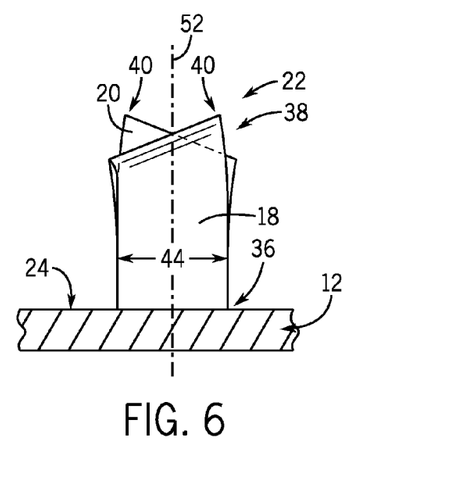
FIG. 6 is a side view of a tooth pair of the dual sided connector.

Referring to the embodiment of the dual sided connector 10 depicted in FIGS. 5 and 6, both the first tooth 18 and the second tooth 20 of tooth pair 22 project outwardly from the base plate 12 in the same direction from the first surface 24. The first tooth 18 and second tooth 20 extend generally parallel to each other and generally perpendicular to the base plate 12. The first tooth 18 and second tooth 20 are trapezoidal in shape with a base end 36 connected to the base plate 12 and an outwardly extending end 38 away from the first surface 24. The outwardly extending end 38 of the first tooth 18 terminates in a tip 40. The outwardly extending end 38 of the second tooth 20 terminates in a tip 42. The tip 40 and tip 42 may simply come to points, but also may be manufactured so as to be chiseled in profile. The tip 40 of the first tooth 18 matches in height, the tip 42 of the second tooth 20.

The tip 42 of the second tooth 20 is offset from the tip 40 of the first tooth 18, as seen in FIG. 6. Teeth 18 and 20 each have a vertical axis 52 as will be described in further detail herein. The tips 40 and 42 may be offset from each other at opposite sides of the vertical axis 52 of their respective tooth. Thus tip 40 is offset to one side of vertical axis 52 and tip 42 is offset to the other side of vertical axis 52. The offset of tips 40 and 42 of this embodiment provide particular advantages when the dual sided connector 10 is used to join two or more members of building material. One advantage is that the offset nature of tip 40 and tip 42 help to evenly balance each building material member on the connector 10 and promote even insertion of the teeth (18, 20) into the building material members. Additionally, the tips (40, 42) reduce the force necessary to penetrate the building material member and help to reduce any instances of splitting in the building material members as a result of the insertion of teeth into the building material members.

The offset tips 40 and 42 provide an additional advantage in manufacturing the dual sided connector 10. In this embodiment, a die used to cut the tooth pair 22 can cut both the first tooth 18 and the second tooth 20 at the same time as the offset tips (40, 42) of the first and second teeth (18, 20) interlace in the die pattern. Thus only a single die cut is needed to cut both the first tooth 18 and the second tooth 20 including the tips (40, 42) of the teeth. Therefore, in some embodiments, the dual sided connector 10 may have the additional benefit of providing the presently disclosed features with a simplified manufacturing process to make the dual sided connector 10.

Still referring to FIGS. 5 and 6, the first tooth 18 and the second tooth 20 are oriented in the tooth pair 22 such that each tooth has an elongated profile 44 and a narrow profile 46. In the tooth pair 22, the elongated profiles 44 of the teeth are parallel and face each other. The elongated profiles 44 of the teeth promote gripping of the building material upon insertion and the narrow profiles 46 of the tooth promote insertion of the tooth into the building material and reduced splitting of the building material.

Referring to FIGS. 1 and 2, the dual sided connector 10 is arranged with a plurality of tooth pairs 22 oriented in a series of rows 48. The rows 48 are aligned on the base plate 12 perpendicular to the elongated profile 44 (See FIG. 6) of the teeth of the tooth pair 22. The plurality of tooth pairs 22 in each of the rows 48 all extend outwardly from the first surface 24 of the base plate 12 in the same direction. The dual sided connector plate 10 is further arranged with a plurality of rows 50 comprising tooth pairs 32 extending outwardly from the second surface 26 of the base plate 12 and in the opposite direction from tooth pairs 22. Rows 50 are aligned on the base plate 12 in an alternating fashion with rows 48 alternatingly extending from the base plate 12 in the opposite direction. The alternating rows 48 and 50 of outwardly extending tooth pairs 22 and tooth pairs 32 in opposite directions promote an even distribution of the tooth pairs (22, 32) extending from the first surface 24 and the second surface 26 of the base plate 12. Therefore, the teeth in rows 48 extend from the base plate 12 in one direction and the teeth in rows 50 extend from the base plate 12 in the opposite direction. Some embodiments of the dual sided connector 10 may feature rows 48 and 50 in which the tooth pairs (22, 32) in alternating rows (48,50) are offset, as depicted in FIGS. 1 and 2. The offset of opposing tooth pairs further improve the uniformity of the distribution of the teeth in the dual sided connector 10 and may promote additional support and structural strength within the base plate 12.

Figure 4:
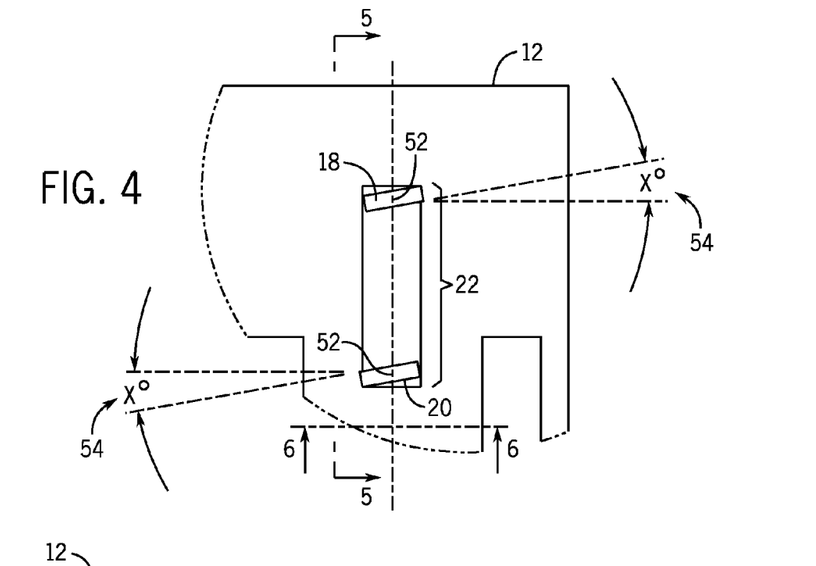
FIG. 4 is a close up view of an embodiment of a tooth pair of the dual sided connector.

Now referring to FIGS. 4-6, as mentioned previously, the first tooth 18 and the second tooth 20 of the tooth pair 22 each comprise a vertical axis 52 perpendicular to the base plate 12. The first tooth 18 and the second tooth 20 are twisted about this axis. Similar or matching twists may be placed in both the first tooth 18 and the second tooth 20 of the tooth pair 22. The twist angle 54 is generally between an angle of zero and 45 degrees from normal. The twist angle 54 may be any angle within this range. In one embodiment, the angle is 20 degrees or less. In another embodiment, the angle is between 10 and 15 degrees. In another embodiment, the angle may be between zero and 10 degrees. In a further embodiment, the angle may be three degrees. The twists in the teeth (18, 20) may be clockwise or counter clockwise, and may all be in the same direction for all of the teeth. In alternative embodiments, the twists in the teeth (18, 20) may be different for different individual teeth, or may be coordinated between tooth pairs 22, rows 48, 50 of tooth pairs, or on each side of the dual sided connector 10. It should be understood that in embodiments wherein the tooth pair 22 is cut by a die, the die may be modified in order to produce the desired angle of the twist, or the orientation of the twist for the teeth in the tooth pair 22.

The feature of the twisted teeth of the dual sided connector 10 provide advantages in use and implementation of the dual sided connector 10 over previous connector designs and implementations as will be described in further detail herein.

Figure 7:
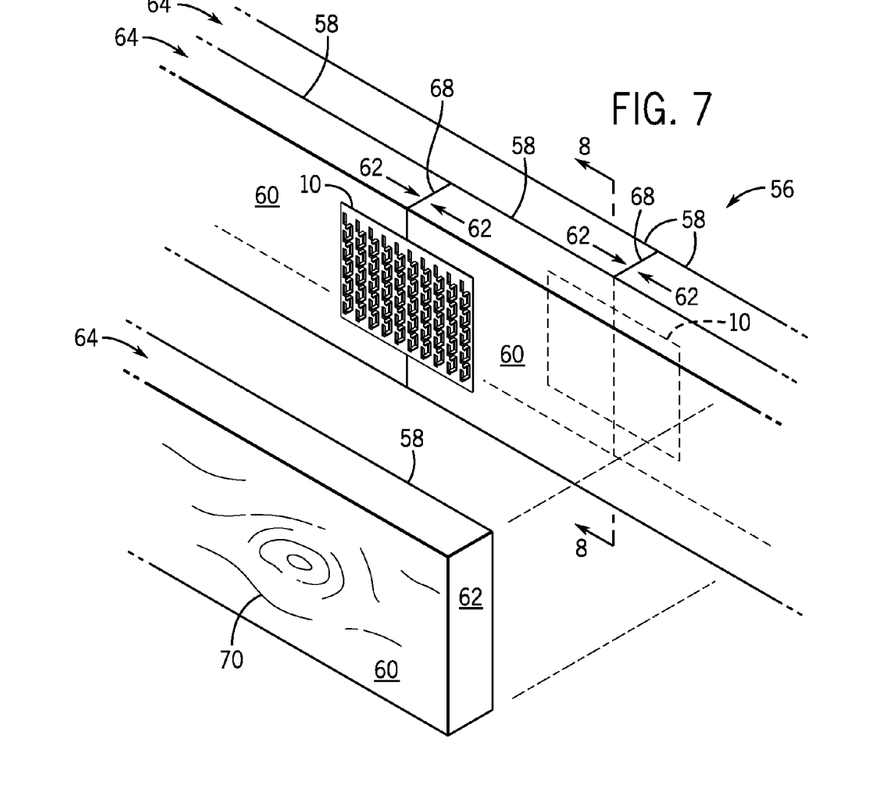
FIG. 7 depicts a composite assembly comprising a dual sided connector.
Figure 8:
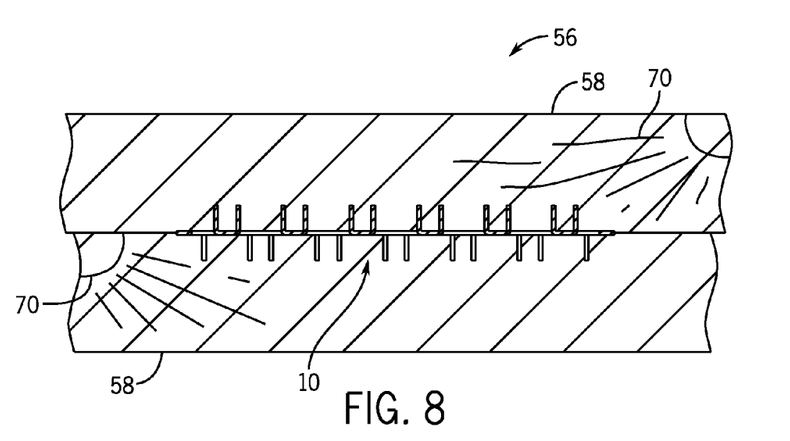
FIG. 8 is a cross sectional view of a composite assembly comprising a dual sided connector.

Referring to FIGS. 7 and 8, the dual sided connector 10 may be used to construct a composite assembly 56 such as a beam, post, column, truss, or the like. The composite assembly 56 may be formed from a plurality of elongated wood boards 58. In the embodiment disclosed in further detail herein the composite assembly 56 comprises a plurality of wood boards 58; however, it is understood that other building material members comprising not only wood and wood composite boards, but engineered boards, synthetic composite materials, or any other suitable building materials as recognized by one skilled in the art may be used. The wood boards 58 may be of varying lengths, but each has face 60 on opposite sides of the board 58 and each board 58 terminates in an end 62.

Wood boards 58 are disposed in an end-to-end relationship wherein the end 62 of one board 58 abuts an end 62 of a second board 58. The ends 62 of the wood boards 58 meet to form a joint 68. The one or more wood boards 58 aligned in the end-to-end relationship form a first layer 64 of the composite assembly 56. The composite assembly 56 may comprise a plurality of layers, depicted here as a second layer 72 and a third layer 74. Each of the layers (64, 72, 74) are made up of at least one wood board 58 and it should be understood that the composite assembly 56 may be made from any number of layers, from two or more.

The first layer 64 and the second layer 72 are aligned in a face-to-face relationship wherein the faces 60 of the wood boards 58 in the first layer 64 are arranged to contact the faces 60 of one or more wood boards 58 of the second layer 72. At least one of the layers, such as first layer 64, includes a plurality of wood boards 58. The joint 68 between the wood boards 58 of the layer 64 is secured using one side of the dual sided connector 10 as disclosed herein to connect the wood board 58 to the other wood board 58 across the joint 68.

In implementation, the composite assembly 56 is formed by aligning a dual sided connector 10 across the joint 68 of two boards 58 in the first layer 64. In one embodiment, the dual sided connector 10 is aligned so that half of the tooth pairs 32 on the second surface 26 of the dual sided connector 10 are arranged over one of the wood boards 58 of the first layer 64 and the other half of the tooth pairs 32 on the second surface 26 of the dual sided connector 10 are arranged over the other wood board 58 of the first layer 64. Thus, the dual sided connector 10 is evenly arranged over the joint 68.

The second layer 72 includes at least one wood board 58 and is arranged over the top of the dual sided connector 10. A single wood board 58 of the second layer 72 is placed in contact with the teeth extending from the first surface 24 of the dual sided connector 10. The composite assembly 56 is arranged in this manner so that the dual sided connector 10 does not cover a joint 68 between two boards 58 in both the first layer 64 and the second layer 72. The staggering of the joints 68 across the layers (64, 72, 74) promotes strength in the fully constructed composite assembly 56. Each staggered joint 68 of one layer is matched with a face of a single wood board 58 of the next layer. Therefore, each dual sided connector 10 of the composite assembly 56 attaches three boards together.

The wood boards 58 are constructed such that a wood grain 70 runs generally along the length of each of the boards 58. In a further aspect of the disclosure, the dual sided connector 10 is aligned over the joint 68 between the boards 58 such that the dual sided connector 10 is square with each of the boards 58 and evenly disposed over the boards 58 of the joint 68. Furthermore, the dual sided connector 10 is arranged with the elongated profile 44 of each of the teeth of the dual sided connector aligned generally parallel with the wood grain 70 of the boards 58. A similar alignment exists between the dual sided connector 10 and the wood board 58 of the second layer 72, aligned in face-to-face relationship with the first layer 64. Therefore, the elongated profile 44 of the teeth of the dual sided connector 10 is also aligned generally parallel with the wood grain 70 of the board 58 of the second layer 72.

While it is understood that the teeth of the dual sided connector 10 are twisted as disclosed above and the grain of the wood boards 58 is generally variable, and therefore the twisted teeth will generally not be perfectly parallel with the grain 70 of the wood board 58, because the twist angle 54 of each of the teeth is less than 45 degrees and the wood grain 70 runs generally parallel to the length of each of the boards 58, if the dual sided connector 10 is square with the board 58, there will be a preferred orientation in which the elongated profile 44 of the teeth of the dual sided connector 10 are more generally parallel with the wood grain 70 and an alternative, less favored orientation in which the elongated profile 44 of the teeth of the dual sided connector 10 are more generally perpendicular to the wood grain 70 of the boards 58. The general alignment of the elongated profile 44 of each of the teeth of the dual sided connector with the wood grain 70 of the boards 58 improves the resulting penetration of the teeth into the wood boards 58 as will be described in further detail herein.

It is understood that in alternative embodiments, the dual sided connector 10 may be aligned such that the elongated profile 44 at the base of the teeth is generally parallel with the wood grain 70. Alternatively still, the elongated profile 44 of each of the teeth at the tip (40, 42) may be aligned generally parallel with the wood grain 70.

Once the wood boards 58 and the dual sided connector 10 have been arranged as disclosed, a compressive force is applied to the wood boards 58 of the composite assembly 56. This presses the dual sided connector 10 into the wood boards 58 of both of the layers. The alignment of the teeth of the dual sided connector 10 in general alignment with the wood grain 70 of the wood boards 58 as well as the tips (40, 42) of the teeth of the dual sided connector 10 and the offset orientation of the tips (40, 42) of the teeth (18, 20) in each tooth pair 22 of the dual sided connector 10 promote the penetration of the teeth into the wood boards 58. This allows for the dual sided connector 10 to embed into the wood boards upon compression of the composite assembly 56 such that the dual sided connector 10 is not visible in the completed composite assembly 56. Rather, the teeth and the base plate 12 of the dual sided connector 10 are embedded between the layers (64, 72, 74) of the wood boards 58. The twisting of each of the teeth of the dual sided connector 10 helps to limit any splitting of the wood boards 58 along the grain of the wood 70 as the teeth enter the wood offset from parallel with the wood grain 70. Yet, the twist angle is acute enough such that the teeth do not enter the wood substantially perpendicular to the wood grain 70 and therefore desirable penetration is achieved into the wood boards 58. The dual sided connector 10 exhibits an improved gripping ability as the twisted teeth are more resistant to loosening over time than straight teeth Embodiments of the composite assembly 56 may include multiple layers to the composite assembly 56, which are represented by layer 74, in order to create the desired width of the composite assembly 56. In these embodiments, one or more additional dual sided connectors 10 may be used to connect the layers of the composite assembly 56. In some embodiments, the outside layer (i.e. second layer 72) on either side of the composite assembly 56 comprises a single integral board running the length of the composite assembly 56. One or more interior layers (i.e. first layer 64 or third layer 74) may comprise a plurality of boards 58 in each layer extending to the desired total length of the composite assembly 56. This presents the advantage of reducing the cost of the composite assembly 56 by using shorter, and therefore less expensive boards 58 on the interior of the composite assembly 56, while the aesthetics of the composite assembly 56 are promoted through the continuous outside facing boards. This eliminates visible joints 68 in the faces of the composite assembly 56 and promotes the illusion that the composite assembly 56 is a single piece of material.

The composite assembly 56 therefore presents the advantages of having an improved aesthetic appearance as the improved penetration of the dual sided connectors 10 hide the dual sided connectors 10 in the interior of the composite assembly 56 by embedding the dual sided connectors 10 into the boards 58 of the composite assembly 56. Also, the orientation of the twisted teeth of the dual sided connector reduces the likelihood of splitting the boards 58 of the composite assembly 56 and thus more consistently produces an aesthetically pleasing composite assembly 56 that is free of splits, cracks, or other defects due to the connector plates. The composite assembly 56 further exhibits the advantage of being stronger than previous composite assemblies as the improved penetration of the teeth and the twisted orientation of the teeth provide a tighter hold between the dual sided connector 10 and the boards 58 of the composite assembly 56. Additionally, the reduced splitting experienced with the disclosed dual sided connector further improves the overall strength and integrity of the composite assembly 56 as splits or other flaws may create weak spots within the composite assembly 56 that are aggravated in load bearing use.

It should be understood from the disclosure herein that many modifications as would be recognized by one skilled in the art may be made to the embodiments disclosed herein and will be considered to be within the scope of this disclosure. In this respect, the dual sided connector as disclosed herein may be constructed to any dimension as one skilled in the art may deem suitable for the desired implementation and use in constructing a composite assembly. In embodiments wherein the dual sided connector is to be embedded within the composite assembly and thus not visible in the finished composite assembly, it is understood that the dimensions of the dual sided connector would include those that are smaller than the dimensions of the wood boards of which the composite assembly is comprised. It is further understood that the composite assembly may include a plurality of layers of wood boards connected by a plurality of dual sided connectors in order to form a composite assembly having greater dimensions than those of the single wooden boards.

The present disclosure contemplates a composite assembly 76 such as may be used as a vertical support column in a residential building structure.

Figure 9:
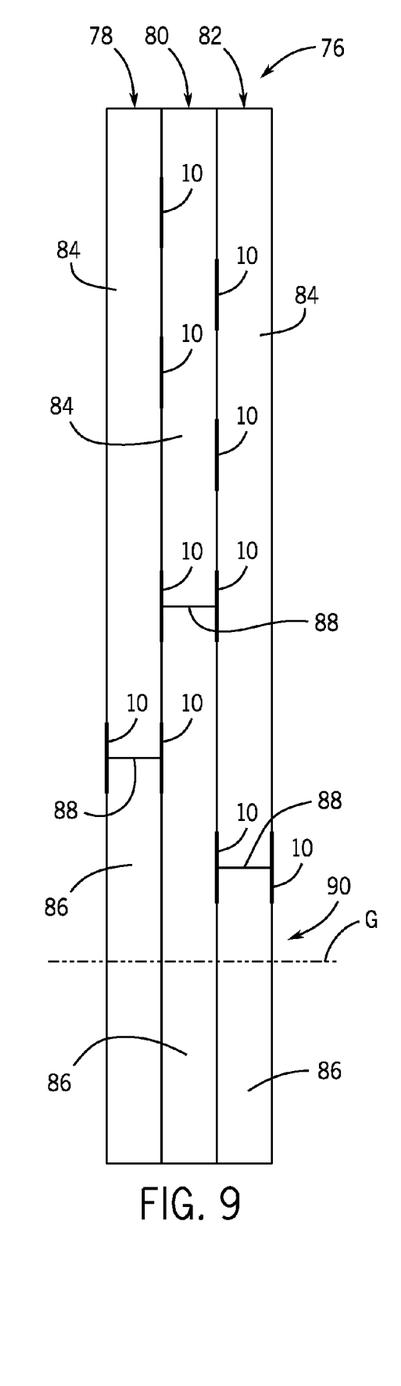
FIG. 9 is a front view of one embodiment of a composite assembly in accordance with the present disclosure.
Figure 10:
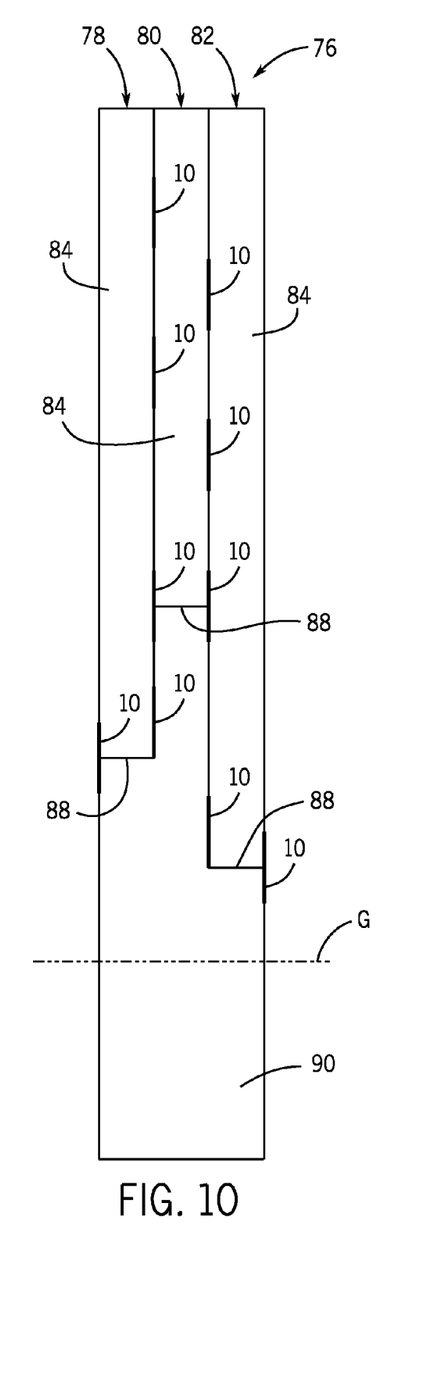
FIG. 10 is a front view of another embodiment of a composite assembly in accordance with the present disclosure.

Referring to FIGS. 9 and 10, the composite assembly 76 is comprised of a series or plurality of opposing elongated layers 78, 80, 82 joined together lengthwise thereof. Each of the layers 78, 80, 82 includes an upper elongated portion in the form of an elongated member 84, and a lower elongated portion in the form of an elongated member 86. The upper and lower elongated portions 84, 86 are secured together in an end-to-end relationship at joints 88 by connector arrangements or connectors 10 as previously described above. Top ends of the upper elongated portions 84 are typically used for supporting a superstructure of a building structure. Bottom ends of the lower elongated portions 86 are embedded securely beneath a ground surface G. Each of the elongated layers 78, 80, 82 are joined together along opposed interior faces by the connectors 10 at the joints 88 as well as at other locations spaced apart from and above the joints 88.

In accordance with the present disclosure, the upper elongated portions 84 are constructed of a first material comprised of wood. In contrast, the lower elongated portions 86 are constructed of a second material comprised of a material other than wood. One example of a non-wood material to be used is plastic; however, it should be understood that the second material is not limited exclusively to plastic, and that use of other non-wood materials in the lower elongated portions 86 is contemplated as desired.

In the embodiments shown in FIG. 9, the upper elongated portions 84 form an upper assembly 92 constructed of single elongated member of wood, exemplarily untreated wood. A lower assembly 90 is constructed of the lower elongated portions 86 which are single members of a non-wood material. It should be understood that the elongated portions 84, 86 may alternatively be constructed of multiple elongated members joined together suitably by connectors 10. For example, upper elongated portions 84 may include more than one elongated member while lower elongated portions 86 may remain fabricated of single elongated members.

As described above, in the embodiment of FIG. 9, the lower assembly 90 is formed of elongated portions 86 embodied in individual elongated members formed separately and individually from one another. In the embodiment of FIG. 10, the lower assembly 90 is formed together as a single unitary structure of non-wood material.

In the representative composite assembly 76 of FIG. 9, the combined length of the elongated layers 78, 80, 82 is substantially equal. For example, each layer 78, 80, 82 has a total length of twenty feet with a width of six inches and a depth of two inches. Layer 78 has an upper elongated portion 84 which is twelve feet in length, and a lower elongated portion 86 which is eight feet in length. Layer 80 has an upper elongated portion 84 and a lower elongated portion 86 which are each ten feet in length. Layer 82 has an upper elongated portion 84 which is fourteen feet in length, and a lower elongated portion 86 which is six feet in length. In this example, the joints 88 secured by the connectors 10 are staggered which promotes strength in the fully constructed composite assembly 76. Additional configurations and dimensions of the composite assembly 76 are envisioned by the disclosure. For example, one or more of the layers 78, 80, 82 may be elongated in a single elongated member constructed of plastic or another non-wood material throughout its length. At least two of the elongated layers 78, 80, 82 have upper elongated portions 84 comprised of wood, and lower elongated portions 86 comprised of a non-wood material.

FIGS. 11-15 illustrate a further embodiment of a composite assembly 94 such as may be used as a vertical support column in a building structure. The building structure may be a residential, commercial, or industrial building structure. The composite assembly 94 is comprised of a series of opposing elongated layers 96, 98, 100 joined together lengthwise thereof. Each of the layers 96, 98, 100 includes an upper elongated portion in the form of an elongated member 102 which is typically constructed of a first material comprised of wood, such as untreated wood. The upper elongated portions 102 together collectively form an upper assembly 104. Top ends of the upper elongated portions 102 are typically used for supporting a superstructure of a building.

Figure 13:
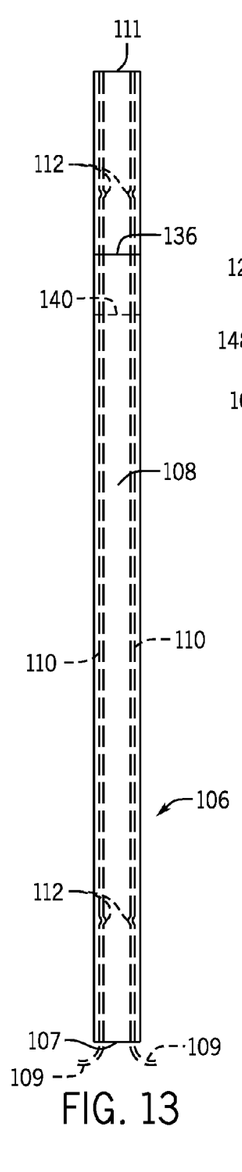
FIG. 13 is a side view of a central elongated region of the composite assembly shown in FIGS. 11 and 12.
Figure 14:
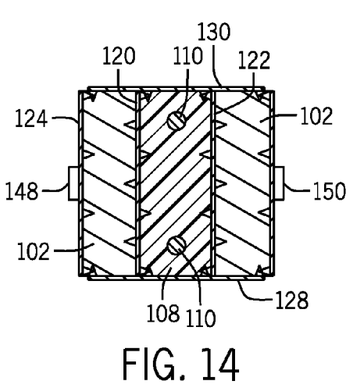
FIG. 14 is an enlarged sectional view taken on line 14-14 of FIG. 11.
Figure 15:
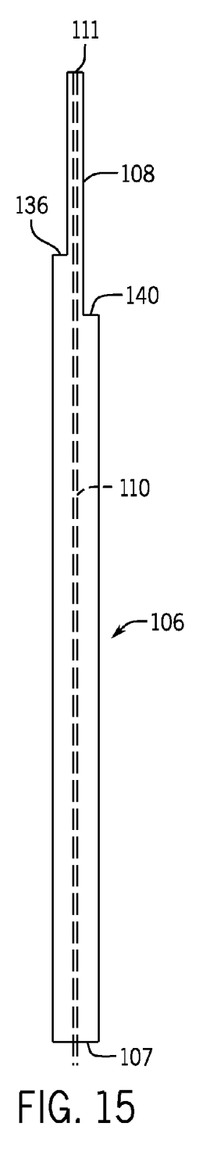
FIG. 15 is a front view of a unitary lower assembly used in the composite assembly of FIG. 11.

The composite assembly 94 also includes a unitary lower assembly 106 having a flat lower end 107 embedded securely beneath the ground surface G. The lower assembly 106 is constructed of a second material which is a non-wood material such as plastic, although other non-wood materials besides plastic may be used. The lower assembly 106 has a central region 108 which is provided with reinforcing structure in the form of a pair of spaced apart reinforcing rods 110 as best seen in FIGS. 13 and 14. The rods 110 are typically embodied as rebar constructed of one-half inch diameter steel which extend longitudinally through the central region 108 of the lower assembly 106 from a flat upper end 111 thereof to and beneath the flat lower end 107 thereof for embedding in the ground. Each of the rods 110 is preferably formed with bends 112 extending inwardly a similar distance, exemplarily one foot, from the upper and lower ends 111, 107, respectively, of the lower assembly 106 to facilitate the securement of the rods 110 within the lower assembly 106 such as during formation of a plastic or other non-wood lower assembly 106. In an exemplary embodiment wherein the lower assembly 106 is a plastic composite material, the lower assembly 106 may be cast or molded around the rods 110. In such embodiments, the bends 112 may function to keep the rods 110 from separating from the lower assembly 106 during use.

Figure 11:
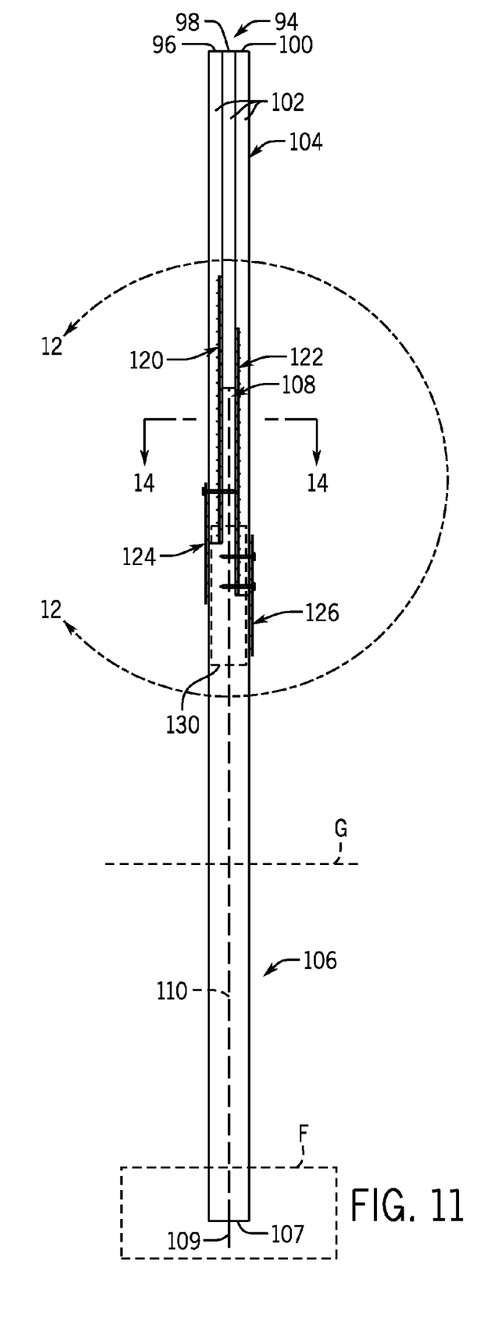
FIG. 11 is a broken into front view of yet another embodiment of a composite assembly in accordance with the present disclosure.

In an exemplary embodiment, the reinforcing rods 110 further extend out from the lower end 107 in projections 109. The projections 109 may exemplarily bend or angle away from one another and the generally parallel orientation of the reinforced rods 110 when extending through the lower assembly 106. In an embodiment, the projections 109 extend in a generally perpendicular direction from the rest of the reinforcing rod 110 and extend in such direction beyond a width of the lower assembly 106. As depicted in FIG. 11, the lower assembly 106 may be secured within a footing F beneath the ground surface G. In an example, the footing F is a poured concrete footing. The projections 109 extend into the footing F and further facilitate to secure the lower end 107 of the lower assembly 106 in position beneath the ground G.

At least two of the elongated layers 96, 98, 100 have upper elongated portions 102 comprised of wood, and the lower assembly 106 comprised of a non-wood material, such as a solid plastic core.

The upper elongated portions 102 and various height portions of the lower assembly 106 are joined together in an end-to-end relationship at joints 114, 116, 118 by connector arrangements formed by respective pairs of connector plates 120, 122, splice plates 124, 126 and deflection plates 128, 130. The joints 114, 116, 118 are staggered in height relative to one another as in the composite assembly 76 of FIGS. 9 and 10 to promote strength in the composite assembly 94. The joint 114 is formed between a flat lower end 132 of the upper elongated portion 102 of layer 98 and the flat upper end 111 of the central region 108 of the lower assembly 106. The joint 116 is formed between a flat lower end 134 of the upper elongated portion 102 of layer 96 and an inwardly extending ledge 136 formed on the lower assembly 106. The joint 118 is formed between a flat lower end 138 of the upper elongated portion 102 of the layer 100 and an inwardly extending ledge 140 of the lower assembly 106.

Figure 12:
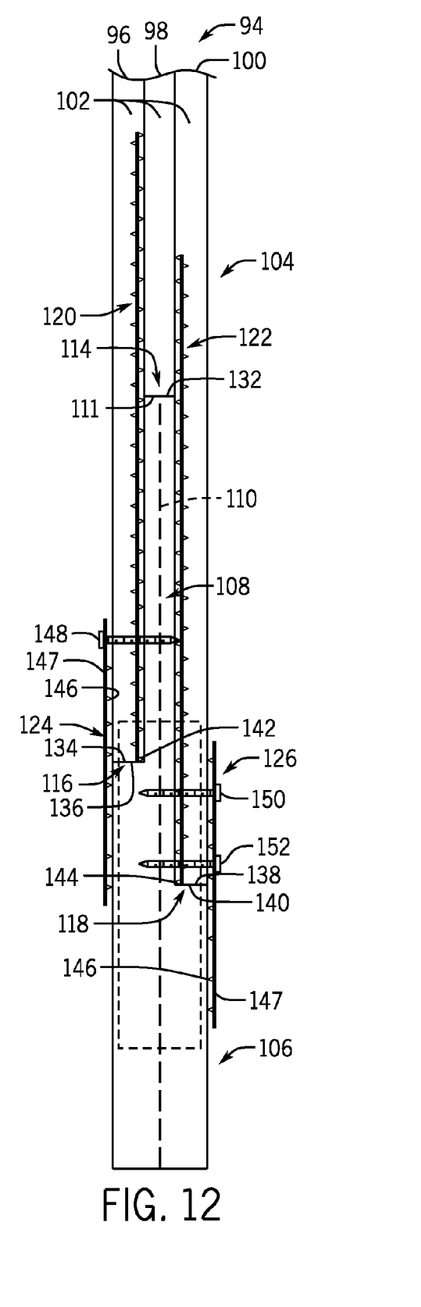
FIG. 12 is an enlarged detail view taken on line 12-12 of FIG. 11.

The plates 120, 122 define a first plate structure, take the form of dual-sided connectors 10 as described above and are used to join the elongated layers 96, 98, 100 along opposed interior faces thereof. In the examples shown, each of the plates 120, 122 have equal lengths with the plates 120, 122 lying parallel to each other and with their upper and lower ends in staggered relationship relative to one another. The plate 120 and plate 122 extend the lengths of respective sides of the central region 108, the joint 114 continue along the elongated layer 98. Elongated layer 96 is secured to the plate 120. Elongated layer 100 is secured to the plate 122. As best depicted in FIG. 12, the plate 120 is positioned across the joint 114 and has a lower end 142 which extends to and terminates at the joint 116. It is to be recognized that in alternative embodiments, the plate 120 terminates shortly before the joint 116. The plate 122 is positioned across the joint 114 and has a lower end 144 which extends to and terminates at the joint 118. It is to be recognized that in alternative embodiments, the plate 122 terminates shortly before the joint 118.

The splice plates 124, 126 define a second plate structure and are preferably configured with single-sided connectors formed with teeth 146 only on an inwardly facing surface of a base plate 147. The plates 124, 126 are of equal length, lie parallel to one another and have upper and lower ends which are in staggered relationship relative to one another. The plate 124 is centered lengthwise across the joint 116 along exterior side faces of the layer 96 and the lower assembly 106. A screw fastener 148 is passed through an upper end of the plate 124, the layer 96 and the plate 120, and is secured in the central region 108 of the lower assembly 106 to anchor the plate 124 on the composite assembly 94 such that the teeth 146 penetrate the exterior side faces of the layer 96 and the lower assembly 106 above and below the joint 116. This further serves to secure the flat lower end 138 to the lower assembly 106, and particularly to the central region 108. The plate 126 is centered lengthwise across the joint 118 along exterior side faces of the layer 100 and the lower assembly 106. A screw fastener 150 is passed through the plate 126, the layer 100 and the plate 122, and is secured in the central region 108 of the lower assembly 106 beneath the joint 116. Another screw fastener 152 is passed beneath screw fastener 150 through the plate 126, the layer 100 and the plate 122, and is secured in the central region 108 of the lower assembly 106. The screw fasteners 150, 152 fix the plate 126 on the composite assembly 94 such that the teeth 146 penetrate the exterior side surfaces of the layer 100 and the lower assembly 106 above and below joint 118. This further serves to service the float lower end 134 to the lower assembly 106, and particularly to the central region.

The deflection plates 128, 130 as best seen in FIG. 14 define a third plate structure. The deflection plates 128, 130 are similar to single-sided connector plates 124, 126 and are formed with teeth similar to teeth 146 on only an inwardly facing surface of the plates 128, 130. The plates 128, 130 are exemplarily of equal length and lie parallel to one another. Embodiments of the deflection plates 128, 120 have respective upper and lower ends as well as side edges which are aligned with one another. The plates 128, 130 are both centered lengthwise across the joint 118, and are suitably fixed such as by applying a suitable force causing the teeth to be retained in the front and back surfaces of the layers 96, 100 and the lower assembly 106. In the example shown, the upper ends of the plates 128, 130 extend above the joint 116, and the lower ends of the plates 128, 130 extend beneath the joint 118. The width of the plates 128, 130 extend substantially across the width of the composite assembly 94.

Figure 16:
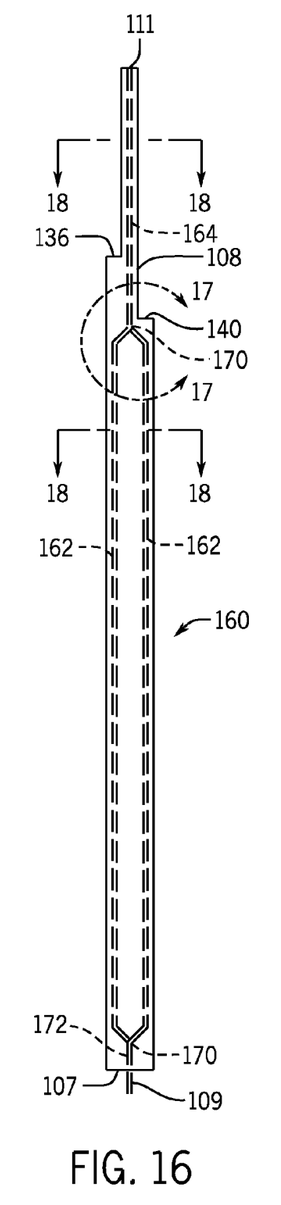
FIG. 16 is a front view of an additional embodiment of a unitary lower assembly.
Figure 17:
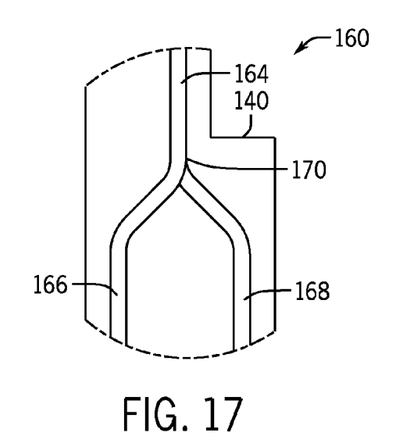
FIG. 17 is an enlarged detail view taken along line 17-17 of FIG. 16.
Figure 18:
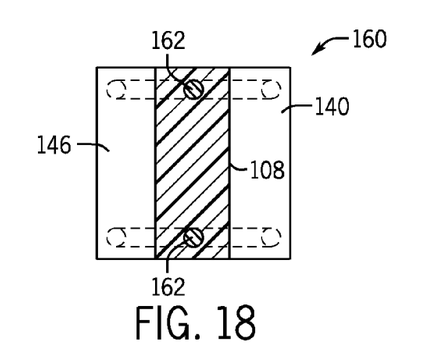
FIG. 18 is an enlarged sectional view taken along line 18-18 of FIG. 16.
Figure 19:
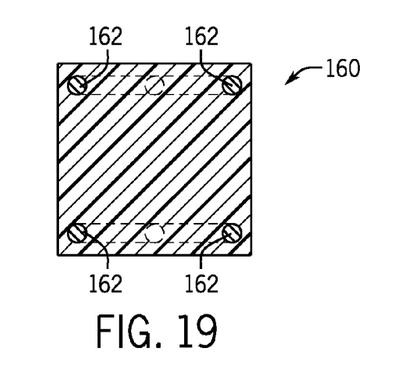
FIG. 19 is an enlarged sectional view taken along line 19-19 of FIG. 16.

FIGS. 16-19 depict a still further embodiment of a lower assembly 160 as may be used in connection with embodiments of the assemblies as presently disclosed. It will be recognized that like reference numerals are used in FIGS. 16-19 as in other previously described figures to denote like structures. This is done for the purpose of conciseness and to highlight features shown in FIGS. 16-19. It will be recognized that various combinations of features of the embodiments as disclosed in the present application may be used while remaining within the scope of the present disclosure. In an exemplary embodiment, at least a portion of the lower assembly 160 includes at least four reinforcing rods 162. As best depicted in FIGS. 16, 17, and 19 in an area between the lower end 107 and the upper end 111, and particularly below ledges 136 and 140, two reinforcement rods 162 angle away from the center of the lower assembly 160 and run parallel to one another along a portion of the length of the lower assembly 160. In an exemplary embodiment, the center of the lower assembly 160 is approximated by the center region 108. In an exemplary manufacture of an exemplary embodiment as disclosed herein, the plastic and/or composite material of the lower assembly 160 may exemplarily be cast or molded about the reinforcing rods 162.

FIG. 17 is an enlarged view of a portion of FIG. 16 as denoted by line 17-17 in FIG. 16. In FIG. 17, the reinforcing rods 162 angle away from a rod upper portion 164, which is exemplarily aligned along a center of the lower assembly 160 and center region 108. In the embodiment depicted, the reinforcing rods 162 angle away at a 45 degree angle. However, it will be recognized that this angle may be within a variety of other angles including 20 degrees, 70 degrees or other angles therebetween. Additionally the angles may be between 10-80 degrees or other angles. In one embodiment, one of the reinforcing rods 162 is an elongated rod 166 that extends the entire length of the lower assembly 160, and may exemplarily end at the lower end in the projections 109. The elongated rods 166 thus make up the upper rod portion 164. A support rod 168 connected at connecting points 170, which may exemplarily be end welds, to the elongated rod 166 and extend within at least a portion of the lower assembly 160. The support rod 168 may end at connection point 170 at a lower portion 172 of the elongated rod 166. FIG. 18 is a sectional view taken along line 19-19 and depicts the two reinforcing rods 162 extending within the center region 108. FIG. 19 is a sectional view taken along line 19-19 and depicts four reinforcing rods 162 extending within the lower assembly 160. In an exemplary embodiment, the reinforcing rods 162 as depicted in FIG. 19 may be located ⅞ inch from the exterior sides of the lower assembly 160, although this is not intended to be limiting. In still further embodiments, one or more of the reinforcing rods 162 may include one or more bends (not depicted) such as exemplarily depicted in FIG. 13 and described above. In another embodiment (not depicted), both rods continue through the center region as a rod pair. In a still further embodiment, all four of the reinforcing rods may extend as projections 109 out from the lower end 107.

This written description uses examples to disclose various embodiments including the best mode, and also to enable any person skilled in the art to make and use these embodiments. The patentable scope is defined by the claims and may extend to include other examples not explicitly listed that occur to those skilled in the art. Such other examples are intended to be within the scope of the claims if they have structural elements that do not differ from the literal language of the claim, or if they include equivalent elements with insubstantial differences from the literal languages of the claims.

Various alternatives and embodiments are contemplated as being within the scope of the following claims, particularly pointing out and distinctly claiming the subject matter of the present disclosure.

What is claimed is:

1. A composite assembly adapted for use as a support column in a building structure, the composite assembly comprising:
   a series of elongated layers joined together lengthwise thereof, at least two of the elongated layers each having an upper elongated portion and a lower elongated portion secured together in an end-to-end relationship at a joint therebetween by a connector arrangement;
   wherein the series of elongated layers is joined together along opposed interior faces thereof by the connector arrangement at locations spaced apart from the joints between the upper elongated portion and the lower elongated portion;
   wherein the upper elongated portion of each of the at least two of the elongated layers is constructed of a first material comprised of wood; and
   wherein the lower elongated portion of each of the at least two of the elongated layers is constructed of a second material comprised of a material other than wood,
   wherein the connector arrangement comprises a series of dual sided connectors, each dual sided connector including:
   a base plate having a first surface and a second surface;
   a first tooth pair extending outwardly from the first surface of the base plate, the first tooth pair comprising a first tooth and a second tooth, the first tooth and second tooth each having a vertical axis perpendicular to the first surface of the base plate, the first tooth and second tooth being twisted about the vertical axis; and
   a second tooth pair extending outwardly from the second surface of the base plate, the second tooth pair comprising a third tooth and a fourth tooth, the third tooth and fourth tooth each having a vertical axis perpendicular to the second surface of the base plate, the third tooth and fourth tooth being twisted about the vertical axis.

2. The composite assembly of claim 1, wherein the lower elongated portions of the at least two of the elongated layers are constructed of a plastic material.

3. The composite assembly of claim 1, wherein the lower elongated portions are embodied in separate, individually formed members.

4. The composite assembly of claim 1, wherein the lower elongated portions are jointly formed together in a unit.

5. The composite assembly of claim 1, wherein the lower elongated portion of each of the at least two of the elongated layers is constructed of a single elongated member.

6. The composite assembly of claim 1, wherein the upper elongated portion of each of the at least two of the elongated layers is constructed of at least one elongated member.

7. A composite assembly adapted for use as a vertical support column in a building structure, the composite assembly comprising:
 a series of elongated layers joined together lengthwise thereof, at least two of the elongated layers each having an elongated upper portion and a unitary lower assembly secured together in an end-to-end relationship at a joint therebetween by a connector arrangement;
 wherein a central region of the unitary lower assembly is provided with at least one reinforcing rod structure;
 wherein the upper elongated portion of each of the at least two of the elongated layers is constructed of a first material comprised of wood;
 wherein the unitary lower assembly of the at least two elongated layers is constructed of a second material comprised of a material other than wood; and
 wherein each joint between the elongated upper portion and the unitary lower assembly is staggered at different heights relative to one another.

8. The composite assembly of claim 7, wherein one joint between one of the elongated upper portions and the unitary lower assembly is formed by engagement between a lower end of the one elongated upper portion and an inwardly projecting ledge extending from one side surface of the unitary lower assembly to a central region of the unitary lower assembly.

9. The composite assembly of claim 8, wherein another joint between another of the elongated upper portion and the unitary lower assembly is formed by engagement between a lower end of the other elongated upper portion and an upper end on the central region on the unitary lower assembly.

10. The composite assembly of claim 7, wherein the at least one reinforcing rod extends longitudinally from an upper end of the central region to at least a lower end of the central region, and the at least one reinforcing rod extends exterior from the lower end in at least one projection.

11. The composite assembly of claim 7, wherein the at least one reinforcing rod comprises a first reinforcing rod and a second reinforcing rod, each of the first and second reinforcing rod comprising an elongated rod and a support rod, the elongated rod having an upper portion and a lower portion and the support rod secured to the elongated rod, and the elongated rod and the support rod are angled with respect to the upper portion and the lower portion of the elongated rod.

12. A composite assembly adapted for use as a vertical support column in a building structure, the composite assembly comprising:
 a series of elongated layers joined together lengthwise thereof, at least two of the elongated layers each having an elongated upper portion and a unitary lower assembly secured together in an end-to-end relationship at a joint therebetween by a connector arrangement;
 a first plate structure, centered lengthwise on a first joint and terminating at a second joint, the series of elongated layers joined together along opposed interior faces thereof by the connector arrangement in the form of the first plate structure; and
 a second plate structure centered lengthwise on the second joint and positioned on side surfaces of the upper elongated portion of the unitary lower assembly, at least two of the elongated upper portions secured to the unitary lower assembly by the connector arrangement in the form of the second late structure;
 wherein the upper elongated portion of each of the at least two of the elongated layers is constructed of a first material comprised of wood;
 wherein the unitary lower assembly of the at least two elongated layers is constructed of a second material comprised of a material other than wood; and
 wherein each joint between the elongated upper portion and the unitary lower assembly is staggered at different heights relative to one another.

13. The composite assembly of claim 12, wherein the second plate structure is connected to the upper elongated portion, the first plate structure and a central region of the unitary lower assembly.

14. The composite assembly of claim 13, wherein the at least two of the elongated layers each having the upper elongated portion and the unitary lower assembly are secured together by the connector arrangement in the form of a third plate arrangement fixed on front and back surfaces of the upper elongated portion and the unitary lower assembly.

15. The composite assembly of claim 12, wherein the first plate structure includes a base plate provided with a first surface having a first set of teeth projecting outwardly therefrom, and a second surface having a second set of teeth projecting outwardly therefrom opposite the first set of teeth.

16. The composite assembly of claim 12, wherein the first plate structure and the second plate structure each have a base plate provided with a set of teeth projecting from only one side of the base plate.

17. The composite assembly of claim 13, wherein the second plate structure includes fastener structure for securing the second plate structure, the upper elongated portion, the first plate structure and the central region of the unitary lower assembly together.

* * * * *